United States Patent [19]

Bouvard

[11] 3,876,856

[45] Apr. 8, 1975

[54] FILLER MATERIAL AND ELECTRODE FOR THE HETEROGENEOUS FUSION WELDING OF IRONS

[75] Inventor: Pierre Joseph Bouvard, Pont-A-Mousson, France

[73] Assignee: Centre de Recherches de Pont-A-Mousson, Maidieres, France

[22] Filed: July 23, 1973

[21] Appl. No.: 381,461

[30] Foreign Application Priority Data
Aug. 3, 1972 France .............................. 72.28067

[52] U.S. Cl. ................................................ 219/146
[51] Int. Cl. ............................................. B23k 35/22
[58] Field of Search ...................................... 219/146

[56] References Cited
UNITED STATES PATENTS
3,184,577    5/1965    Witherell ............................ 219/146

FOREIGN PATENTS OR APPLICATIONS
943,294    3/1949    France .............................. 219/146
858,854    1/1961    United Kingdom ................. 219/146

Primary Examiner—J. V. Truhe
Assistant Examiner—Clifford C. Shaw
Attorney, Agent, or Firm—Sughrue, Rothwell, Mion, Zinn and Macpeak

[57] ABSTRACT

Filler material and an electrode for heterogeneous fusion welding of iron parts.

The feature of the filler material is that the metallic substance deposited by the filler material has, by weight, a nickel content of between 36 and 40 percent and a carbon content of between 0.15 and 3 percent, the remainder being iron.

The invention has an advantageous application in the welding of lamellar, nodular or spheroidal graphite iron.

6 Claims, No Drawings

FILLER MATERIAL AND ELECTRODE FOR THE HETEROGENEOUS FUSION WELDING OF IRONS

The present invention relates to a filler material and to an electrode for the heterogeneous welding by fusion of irons and in particular lamellar or nodular graphite irons including, among the latter, parts of spheroidal graphite iron.

The heterogeneous welding of these irons by means of filler materials based on nickel is of high interest owing to the simplicity of its mode of operation. In particular, the parts to be joined usually do not need to be brought to a temperature higher than 300°C. This possibility of operating practically in cold conditions, or aat any rate with a very moderate pre-heating, is therefore a very important advantage. However, there is a drawback to this manner of proceeding; the joints obtained have a tendency to split.

British Pat. No. 298,781 mentions the interest of alloys having a nickel content of between 1 and 40 percent. However, such a range of values lacks precision. Experience has shown, indeed, that certain compositions selected in the lower part of this range, namely below 25 percent, give rise to another defect: unmachinability. These compositions indeed produce weld bead structures containing high proportions of martensite which is well known for the hardness it imparts to the metal. This hardness renders the welds unsuitable to receive the finishing machining operation which would very often be necessary.

Other patents, such as the French Pat. No. 1,406,383 recommend a range of 40 to 60 percent of nickel. This range is still too vague to be of utility in an advantageous manner without other tests or precision. Moreover, the price of alloys as rich in nickel obviously restricts the use thereof to particular applications.

Therefore, an object of the present invention is to provide a filler material which is as cheap as possible and gives welds which have no tendency to split while possessing good machinability.

The invention provides a filler material for the heterogeneous welding by fusion of parts of lamellar, nodular or spheroidal graphite iron of the type comprising essentially an alloy of iron and nickel, wherein the metal deposited has, by weight, a nickel content of between 36 and 40 percent and a carbon content of between 0.15 and 3 percent, the remainder being iron. Apart from this iron the remainder of the metal deposited of course contains the inevitable impurities.

The presence of carbon ensures good resistance to splitting in the course of solidification.

The weld bead deposited possesses a wholly austenitic structure and therefore has remarkable mechanical properties in particular as concerns elongation to fracture and resilience.

Its coefficient of thermal expansion is very low and distinctly below $6 \times 10^{116\ 6}$ for all temperatures below 250°C. This characteristic enables the weld to pass through, without marked increase in residual stresses, the temperature gap between 250°C and room temperature in which splits are usually created. This superiority of the welds achieved with the filler material according to the invention over welds produced under the same conditions with other copositions, and in particular compositions having 55 percent of nickel, has been demonstrated experimentally by the Applicant. Furthermore, the machinability of the weld beads deposited in accordance with the invention, under cold conditions or with a pre-heating to at the most 300°C, is satisfactory.

According to the invention, the filler material may moreover comprise optionally, to a maximum proportion of 5 percent, deoxidizing agents, such as silicon, aluminium, titanium, zirconium, cerium or other rare earths. These agents serve to ensure that bubbles of carbon monoxide formed by the combination of the carbon atoms with the oxygen present in the bath are not trapped in the weld by the cooling before having had time to travel to the surface. Blisters are in this way avoided.

Another object of the invention is to provide the electrode constituted by a material of the considered type.

The following examples, to which the invention is not intended to be limited, are given by way of illustrations of the possibilities of application of the invention. All the figures given are in percentages by weight.

EXAMPLE 1

There is employed an electrode comprising:
a core of ferro-nickel containing:
  50 to 60 percent of nickel and,
a coating comprising:
  30 to 50 percent of barium and calcium carbonate
  10 to 15 percent of fluor-spar
  0 to 5 percent of iron in the form of oxide
  25 to 35 percent of iron in the form of powder
  5 to 15 percent of carbon
  binders such as alkaline silicates,
  a small amount of product facilitating pressing and
  0 to 5 percent of de-oxidizing agent.

The diameter of the coating is about 8 mm for a core of 4 mm.

In the case where a core has a diameter of 3.15 mm, the metal deposited contains, in a particular case:
1.10 percent of C
39.4 percent of Ni.

In respect of a core of 4 mm, it also contains in a particular case:
1.07 percent of C
38.9 percent of Ni.

EXAMPLE 2

There is employed an electrode comprising:
a core of mold steel and
a coating containing:
  25 to 40 percent of barium or calcium carbonate
  5 to 15 percent of fluor-spar
  0 to 5 percent of iron in the form of oxide
  40 to 60 percent of nickel in powdered form
  10 to 30 percent of carbon
  binders such as alkaline silicates,
  a small amount of products facilitating pressing, and
  0 to 5 percent of de-oxidizing agent.

The diameter of the coating is about 8 mm for a core of 4 mm.

EXAMPLE 3

30 percent of the powdered nickel contained in the coating of the composite electrode according to Example 2 is replaced in the same proportions by powdered cobalt.

EXAMPLE 4

A filled wire is employed comprising a wound mild steel ribbon which is filled with powdered nickel and powdered graphite, the proportions being the following:

ribbon 60 to 65 percent
powdered nickel 35 to 40 percent
powdered graphite 0.15 to 3.00 percent
de-oxidizing agent 0 to 5 percent.

This wire must be employed either under a solid flux or under a neutral protecting gas.

In respect of an inside diameter of the ribbon of 3.15 mm, the metal deposited contains, in a particular case:

0.98 percent of C
37 percent of Ni.

Having now described my invention what I claim as new and desire to secure by letters patent is:

1. An electrode for the heterogeneous welding by fusion of parts of lamellar, nodular or spheroidal graphite iron having mainly an alloy of iron and nickel, said electrode comprising, by weight, a ferro-nickel core containing 50 to 60 percent of nickel and a coating comprising 30 to 50 percent of barium carbonate and calcium carbonate, 10 to 15 percent of fluor-spar, 0 to 5 percent of iron in the form of oxide, 25 to 35 percent of iron in the form of powder, 5 to 15 percent of carbon, a binder, a product facilitating pressing, and 0 to 5 percent of de-oxidizing agent.

2. An electrode for the heterogeneous welding by fusion of parts of lamellar, nodular or spheroidal graphite iron, said electrode comprising, by weight,
   a core of mild steel and
   a coating containing:
      25 to 40 percent of barium carbonate
      5 to 15 percent of fluor-spar
      0 to 5 percent of iron in the form of oxide
      40 to 60 percent of nickel in powdered form
      10 to 30 percent of carbon
      a binder,
      a product facilitating pressing, and
      0 to 5 percent of de-oxidizing agent.

3. An electrode for the heterogeneous welding by fusion of parts of lamellar, nodular or spheroidal graphite iron, said electrode comprising, by weight, a core of mild steel and a coating containing 25 to 40 percent of barium carbonate, 5 to 15 percent of fluor-spar, 0 to 5 percent of iron in the form of oxide, 10 to 30 percent of nickel in powdered form, 30 percent of powdered cobalt, 10 to 30 percent of carbon, a binder, a product facilitating pressing, and 0 to 5 percent of de-oxidizing agent.

4. A filled wire for the heterogeneous welding by fusion of parts of lamellar, nodular or spheroidal graphite iron, said electrode comprising, by weight, 60 to 65 percent of a ribbon of wound mild steel filled with 35 to 40 percent of powdered nickel, 0.15 to 3.00 percent of powdered graphite and 0 to 5 percent of de-oxidizing agent.

5. An electrode for the heterogeneous welding by fusion of parts of lamellar, nodular or spheroidal graphite iron, said electrode comprising, by weight,
   a core of mold steel and
   a coating containing:
      25 to 40 percent of calcium carbonate
      5 to 15 percent of fluor-spar
      0 to 5 percent of iron in the form of oxide
      40 to 60 percent of nickel in powdered form
      10 to 30 percent of carbon
      a binder,
      a product facilitating pressing, and
      0 to 5 percent of de-oxidizing agent.

6. An eectrode for the heterogeneous welding by fusion of parts of lamellar, nodular or spheroidal graphite iron, said electrode comprising, by weight, a core of mold steel and a coating containing 25 to 40 percent of calcium carbonate, 5 to 15 percent of fluor-spar, 0 to 5 percent of iron in the form of oxide, 10 to 30 percent of nickel in powdered form, 30 percent of powdered cobalt, 10 to 30 percent of carbon, a binder, a product facilitating pressing and 0 to 5 percent of de-oxidizing agent.

* * * * *